(12) United States Patent
Noh et al.

(10) Patent No.: US 8,605,636 B2
(45) Date of Patent: Dec. 10, 2013

(54) METHOD FOR ACQUIRING HANDOVER NETWORK IN MULTI-MODE TERMINAL AND MULTI-MODE TERMINAL THEREFOR

(75) Inventors: Jeong-Min Noh, Seoul (KR); Myoung-Hoon Cho, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 1524 days.

(21) Appl. No.: 11/645,472

(22) Filed: Dec. 26, 2006

(65) Prior Publication Data

US 2007/0147301 A1    Jun. 28, 2007

(30) Foreign Application Priority Data

Dec. 26, 2005    (KR) .................... 10-2005-0129821

(51) Int. Cl.
*H04W 4/00* (2009.01)

(52) U.S. Cl.
USPC ...... 370/311; 370/324; 370/330; 370/395.62; 370/503; 370/507; 370/905; 455/436; 455/439; 455/442; 455/448; 455/552.1

(58) Field of Classification Search
USPC ............... 455/552.1, 439, 448, 436, 442; 370/311, 324, 330, 395.62, 503, 507, 370/905
See application file for complete search history.

(56) References Cited

U.S. PATENT DOCUMENTS

| | | | |
|---|---|---|---|
| 6,438,117 B1 * | 8/2002 | Grilli et al. ............... | 370/331 |
| 7,079,841 B2 * | 7/2006 | Park ............... | 455/436 |
| 7,206,338 B1 * | 4/2007 | Kubler et al. ............. | 375/222 |
| 2002/0105927 A1 * | 8/2002 | Holma et al. ............. | 370/331 |
| 2003/0032431 A1 * | 2/2003 | Chang .................. | 455/438 |
| 2003/0117977 A1 * | 6/2003 | Kang .................. | 370/331 |
| 2003/0128683 A1 * | 7/2003 | Duncan Ho et al. ...... | 370/338 |
| 2005/0073977 A1 * | 4/2005 | Vanghi et al. ............ | 370/335 |
| 2005/0101325 A1 | 5/2005 | Semper | |
| 2005/0221824 A1 * | 10/2005 | Lee et al. ............. | 455/435.2 |
| 2006/0073829 A1 * | 4/2006 | Cho et al. ............. | 455/439 |
| 2006/0126564 A1 * | 6/2006 | Ramanna et al. ........ | 370/331 |
| 2007/0147303 A1 * | 6/2007 | Noh ...................... | 370/331 |

FOREIGN PATENT DOCUMENTS

KR    10-2001-0073909    8/2001

* cited by examiner

*Primary Examiner* — Amancio Gonzalez (74) *Attorney, Agent, or Firm* — The Farrell Law Firm, P.C.

(57) ABSTRACT

Disclosed is a method capable of minimizing a period of time required for a handover network acquisition procedure when a handover occurs between communication networks which provide communication services using different mobile communication technologies. When a modem for a handover communication network performs network acquisition due to the occurrence of a handover, the modem previously extracts information about a handover channel from a Universal Handover Direction Message (UHDM), and uses the extracted channel information in a network acquisition procedure. Accordingly, the modem for a handover communication network can easily acquire a handover network even without using a preferred roaming list, and can omit an radio frequency (RF) tuning procedure by extracting a corresponding code division multiple access (CDMA) channel from the received UHDM, thereby reducing the total handover processing time period and increasing the success rate of the handover.

8 Claims, 5 Drawing Sheets

METHOD FOR ACQUIRING HANDOVER NETWORK IN MULTI-MODE TERMINAL AND MULTI-MODE TERMINAL THEREFOR

PRIORITY

This application claims the benefit under 35 U.S.C. 119(a) of an application entitled "Method For Acquiring Handover Network In Multi-Mode Terminal And Multi-Mode Terminal Therefor" filed in the Korean Intellectual Property Office on Dec. 26, 2005 and assigned Serial No. 2005-129821, the contents of which are incorporated herein by reference.

BACKGROUND OF THE INVENTION

1. Field of the Invention

The present invention relates to a terminal supporting multiple modes, and more particularly to a method for efficiently acquiring a handover network and a multi-mode terminal therefor, which can minimize a period of time required for acquiring the handover network between communication networks that provide communication services using different mobile communication technologies.

2. Description of the Related Art

Currently, mobile communication technology is evolving from the Code Division Multiple Access (CDMA) and European GSM (Global System for Mobile communication) systems, which are $2^{nd}$ generation network systems, into a $3^{rd}$ generation network system, such as a Wideband CDMA (WCDMA) system. Since there exists a vast and well-equipped service area using the $2^{nd}$ generation communication scheme, the service area using the $3^{rd}$ generation communication scheme is being extended even broader while the base facility for the $2^{nd}$ generation communication scheme is being utilized, during this time of transition. Therefore, a terminal designed to receive a service specified in the $3^{rd}$ generation network during transition is produced as a multi-mode terminal, which can support the existing $2^{nd}$ generation communication scheme in addition to the $3^{rd}$ generation communication scheme.

Such multi-mode terminals include an idle handover function for performing a mode transition between a WCDMA mode and a CDMA mode in an idle state, and a traffic handover function for performing a mode transition to a CDMA mode without discontinuance of communication when the terminal enters a shadow area from a WCDMA network during communication. These functions are economical since they utilize the existing CDMA network in the $2^{nd}$ generation system, but have a disadvantage of needing complicated hardware and software in the terminal, due to the need for quick handover between different modems.

Figure 1:
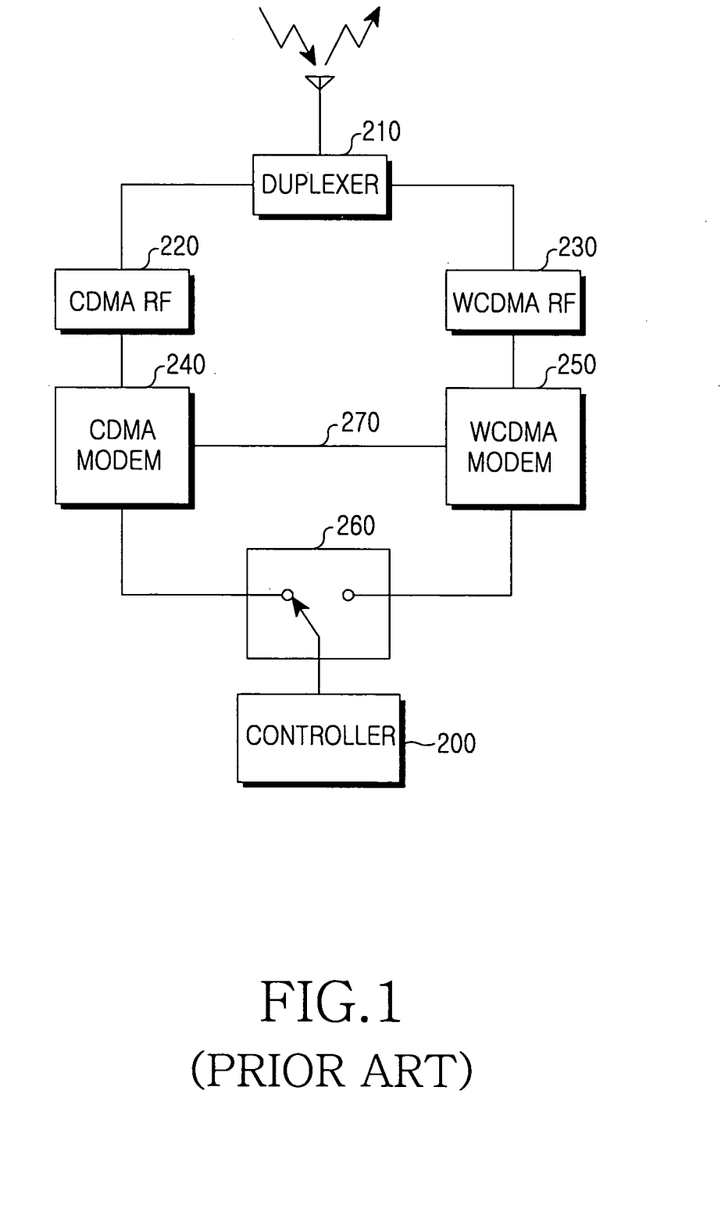
FIG. 1 is a block diagram illustrating the construction of a conventional terminal which performs a handover.

The operation of a terminal, which performs a handover between the two modes during communication, will now be described with reference to FIG. 1. In order to perform a handover to a CDMA mode during communication in a WCDMA mode, both WCDMA modem and CDMA modem included in the terminal are powered on so as to transmit a control signal required for the handover. FIG. 1 shows the construction of a dual-mode terminal, which has a single antenna structure and supports the CDMA and WCDMA modes. In order to support the WCDMA and CDMA modes, the terminal uses modem chips which support different mobile communication services depending on the modes. When the terminal having such a construction is located in a WCDMA network, a CDMA RF unit 220 and a CDMA modem 240 are temporarily powered off, and the single antenna, a duplexer 210, a WCDMA RF unit 230 and a WCDMA modem 250 are powered on, so that the terminal operates in the WCDMA mode. Conversely, when the terminal having such a construction is located in a CDMA network, the WCDMA RF unit 230 and the WCDMA modem 250 are temporarily powered off, and the single antenna, the duplexer 210, the CDMA RF unit 220, and the CDMA modem 240 are powered on, so that the terminal operates in the CDMA mode.

To this end, the modems 240 and 250 are individually connected to a controller 200 through a switch 260, and one modem is powered off while the other modem is operating so as to prevent waste of power. The modems 240 and 250 are connected to each other through an interface 270 for mutual communication.

Meanwhile, when a handover of such a terminal occurs, the terminal must perform a procedure in order to acquire a network, to which the terminal is to be handed over. The procedure will now be described with reference to FIG. 2

Figure 2:
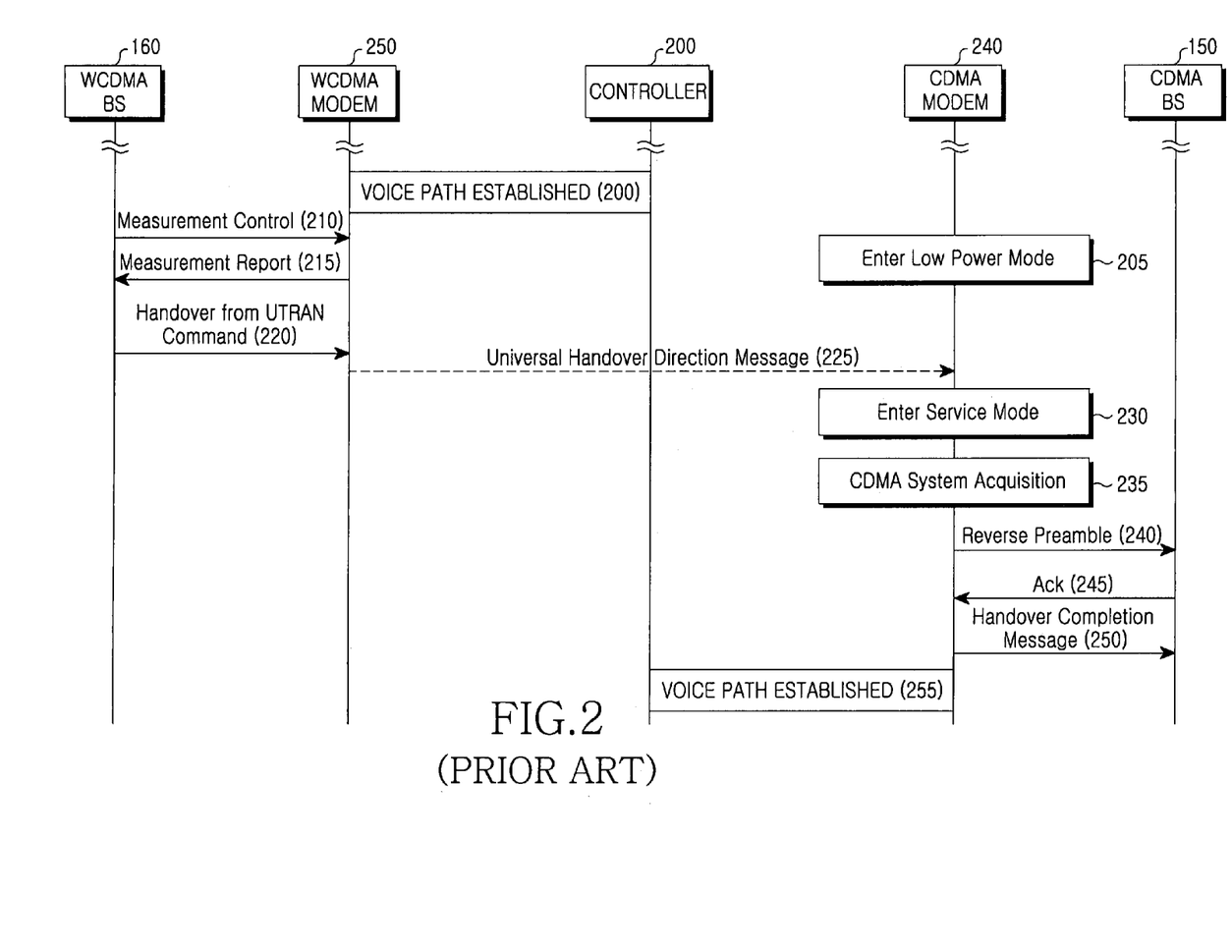
FIG. 2 is a view illustrating the operation of a terminal for performing a conventional handover acquisition procedure.

Referring to FIG. 2, when the user attempts to make communication in a WCDMA mode, a controller 200 establishes a voice communication path through a WCDMA modem 250 in step 200 so that voice communication can be performed. A related communication connection procedure is well-known in the art, so a detailed description thereof will be omitted. When communication begins, the controller 200 switches on a CDMA modem 240 to enable the CDMA modem 240 to enter a low power mode (step 205).

Thereafter, a procedure for determining whether the current radio environment corresponds to a handover condition is performed between the WCDMA modem 250 and a WCDMA base station 160 in steps 210 and 215. When a handover occurs, the WCDMA modem 250 receives a Handover from Umts Terrestrial Radio Access Network (UT-RAN) Command, which instructs a handover into the CDMA mode, in step 220. Then, the WCDMA modem 250 extracts a Universal Handover Direction Message (UHDM) by analyzing the received command, and transmits the UHDM to the CDMA modem 240.

Meanwhile, separate from the operation of the WCDMA modem 250, when the CDMA modem 240 receives the UHDM while in the low power mode, the CDMA modem 240 regards the UHDM as a command to acquire a CDMA network. However, since the CDMA modem 240 has not yet acquired a CDMA network, the CDMA modem 240 cannot perform a handover based on the UHDM. Therefore, when the UHDM has been received, the CDMA modem 240 regards the UHDM as a command to perform an operation for acquiring a system, to which the terminal is handed over, without instantly processing the UHDM. Then, the CDMA modem 240 enters a service mode to analyze a Preferred Roaming List (PRL) in step 230, and performs an operation for acquiring a CDMA network based on a result of the analysis in step 235. When CDMA network acquisition based on the analysis result is successful, the CDMA modem 240 parses the received UHDM to extract channel information for a handover. Accordingly, the CDMA modem 240 can complete the CDMA network acquisition of step 235, by again setting a handover channel based on the extracted channel information for a handover. That is, regardless of reception of the UHDM, the CDMA modem 240 must acquire a network using a PRL before setting a handover channel using the UHDM, so that a network acquisition procedure is performed twice.

The operation performed in steps 230 and 235 will now be described in more detail. The CDMA modem 240 uses a PRL in order to acquire a CDMA network. Herein, the PRL stores CDMA frequencies and bands, which can be acquired by the terminal, and is constructed with all channels capable of being provided by each network provider.

Therefore, the terminal must acquire a CDMA network based on the channel sequence of the PRL. In this case, if a channel of an actual radio environment corresponds to a channel located in the upper portion of the PRL, it is possible to rapidly acquire a corresponding channel. However, in contrast, if a channel of an actual radio environment corresponds to a channel located in the lower portion of the PRL, it takes a long period of time to acquire a CDMA network because the terminal searches channels stored in the PRL one by one according to the sequence thereof.

As described above, according to the conventional traffic handover from a WCDMA network to a CDMA network, although having received the UHDM from a WCDMA modem, the CDMA modem only recognizes the received message as a command to start CDMA network acquisition. This is because a handover procedure of the CDMA modem based on the UHDM is performed after a CDMA network has been acquired. While the CDMA modem performs CDMA network acquisition according to the sequence of channels in the PRL, if a CDMA channel of an actual radio environment corresponds to a channel located in the rear portion of the PRL, it takes a long period of time to acquire a CDMA network, so that much more time is necessary to process a handover. As described above, after having acquired a CDMA network, the CDMA modem must parse the received UHDM, and must again establish a handover channel based on information about the handover channel extracted through the parsing operation, so as to complete the CDMA network acquisition. That is, a channel establishment procedure for a handover must be performed twice.

SUMMARY OF THE INVENTION

Accordingly, the present invention provides a method for efficiently acquiring a handover network and a multi-mode terminal therefor, which can minimize a period of time required for acquiring the handover network between communication networks that provide communication services using different mobile communication technologies.

To this end, there is provided a method for efficiently acquiring a handover network in a multi-mode terminal, which includes a first modem and a second modem supporting different communication services, the method including determining whether a Universal Handover Direction Message (UHDM) is received from a first communication network when it is necessary to acquire a handover network, extracting information about a handover base station from the UHDM when the UHDM has been received, and acquiring a second communication network by using the extracted information.

In addition, there is provided a multi-mode terminal for efficiently acquiring a handover network, the multi-mode terminal including a first modem for extracting a Universal Handover Direction Message (UHDM) from a handover command message, when the first modem receives the handover command message from a first communication network while communicating through the first communication network, and a second modem for receiving the extracted UHDM from the first modem and acquiring a second communication network based on information about a handover base station, which is included in the received UHDM.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. It is to be noted that the same elements are indicated with the same reference numerals throughout the drawings. In the following description, a detailed description of known functions and configurations incorporated herein will be omitted for the sake of clarity and conciseness.

The present invention provides a method capable of minimizing a period of time required for a handover network acquisition procedure when a handover occurs between communication networks that provide communication services using different mobile communication technologies. To this end, when a modem for a handover communication network performs network acquisition due to occurrence of a handover, the modem previously extracts information about a handover channel from a UHDM, and uses the extracted channel information in a network acquisition procedure. Accordingly, the modem for a handover communication network can easily acquire a handover network even without using a PRL, and can omit an RF tuning procedure by extracting a corresponding CDMA channel from the received UHDM, thereby reducing the total handover processing time period and increasing the success rate of the handover.

Figure 3:
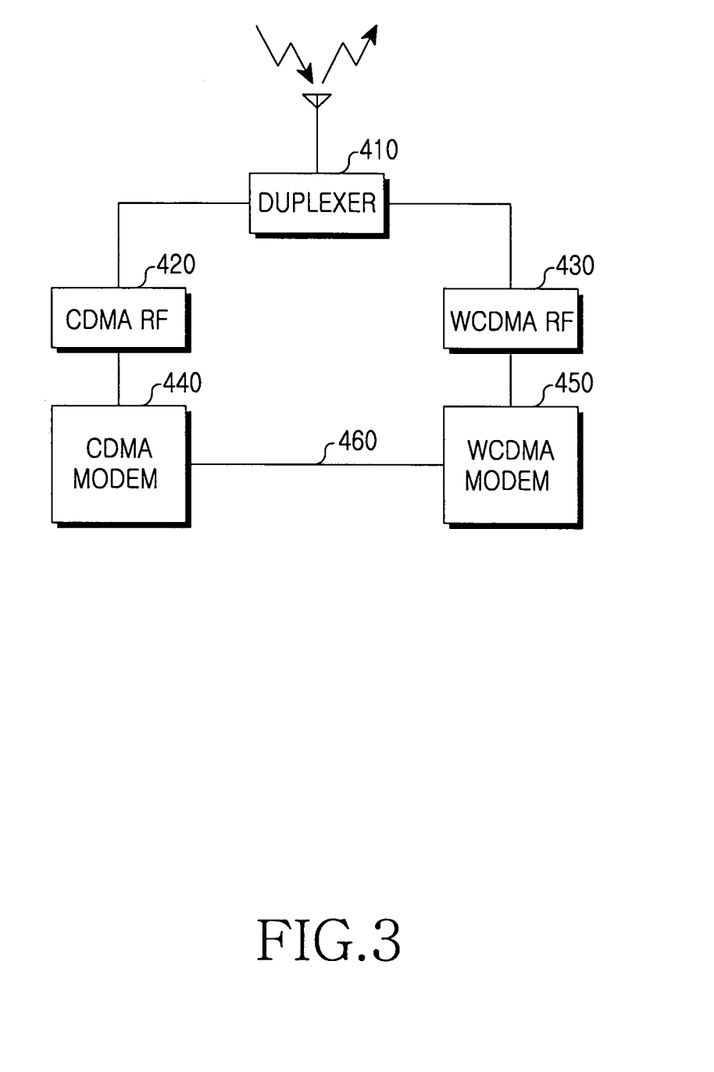
FIG. 3 is a block diagram illustrating the construction of a multi-mode terminal according to the present invention.

FIG. 3 is a block diagram illustrating the construction of a multi-mode terminal according to the present invention. FIG. 3 will be described with respect to CDMA and WCDMA technologies as an example of different mobile communication technologies. The CDMA technology may be replaced with the Global System for Mobile (GSM) communications technology.

The multi-mode terminal supporting WCDMA and CDMA modes includes a WCDMA modem 450 and a CDMA modem 440 so as to perform the operations for the WCDMA and CDMA modes. The modems 440 and 450 are connected through a communication path 460 in order to communicate with each other.

In detail, as shown in FIG. 3, the multi-mode terminal includes an antenna for transmitting/receiving a CDMA signal and a WCDMA signal, a duplexer 410 for dividing the CDMA and WCDMA signals transmitted/received through the antenna, RF units 420 and 430 for processing the CDMA and WCDMA signals, respectively, and modems 440 and 450 for processing the signal transmitted to/received from the RF units 420 and 430 by using relevant processing modules, respectively. In this case, the WCDMA modem 450 and CDMA modem 440 may be integrated on a single modem chip, or may be a digital signal processor (DSP) included in a chip.

FIG. 3 illustrates the construction of the multi-mode terminal having a single antenna structure. Therefore, when the terminal having such a construction is located in a WCDMA network, the CDMA RF unit 420 and the CDMA modem 440 are temporarily powered off, and the antenna, the duplexer 410, the WCDMA RF unit 430, and the WCDMA modem 450 are powered on, so that the terminal operates in the WCDMA mode. Conversely, when the terminal is located in a CDMA network, the WCDMA RF unit 430 and the WCDMA modem 450 are temporarily powered off, and the antenna, the duplexer 410, the CDMA RF unit 420, and the CDMA modem 440 are powered on, so that the terminal operates in the CDMA mode. In this case, the WCDMA modem 450 acts as a processor which communicates with the user by receiving data through the communication path 460 from the CDMA modem 440.

The operations of the WCDMA modem 450 and CDMA modem 440 will now be described in detail.

When a handover occurs, the WCDMA modem 450 receives a handover command message from a WCDMA base station. Then, the WCDMA modem 450 analyzes the received handover command message and extracts a UHDM from the handover command message. The WCDMA modem 450 transmits the UHDM through the communication path 460 to the CDMA modem 440. Thereafter, the WCDMA modem 450 continuously operates until it has received a handover report message, and ends its operation when it has received the handover report message.

A network acquisition procedure of the CDMA modem 440 may be generally classified into an initial network acquisition procedure performed when the terminal is powered on by the user, and a handover network acquisition procedure performed when a handover occurs during communication.

Considering when a handover occurs during communication, when the CDMA modem 440 that has been in a standby state receives a UHDM, the CDMA modem 440 switches on the CDMA RF unit 420 in order to perform network acquisition. Thereafter, the CDMA modem 440 parses the received UHDM so as to acquire base station information included in the UHDM. Then, the CDMA modem 440 transmits a reverse preamble message for communication initialization to a target base station, which is possible because the CDMA modem 440 can understand the target base station by the base station information. Thereafter, when it has received an acknowledgment message from the target base station, the CDMA modem 440 determines that preparation for communication with the target base station has been completed. Therefore, the CDMA modem 440 transmits a handover completion message to the WCDMA modem 450, thereby notifying the WCDMA modem 450 that the handover has been completed.

Considering, in contrast, when a network acquisition procedure is performed because the terminal is powered on by the user, the CDMA modem 440 acquires a CDMA network by using a PRL based on the typical CDMA network acquisition procedure. In this case, such an initial network acquisition procedure is the same as the typical CDMA network acquisition procedure, so a detailed description thereof will be omitted.

Figure 4:
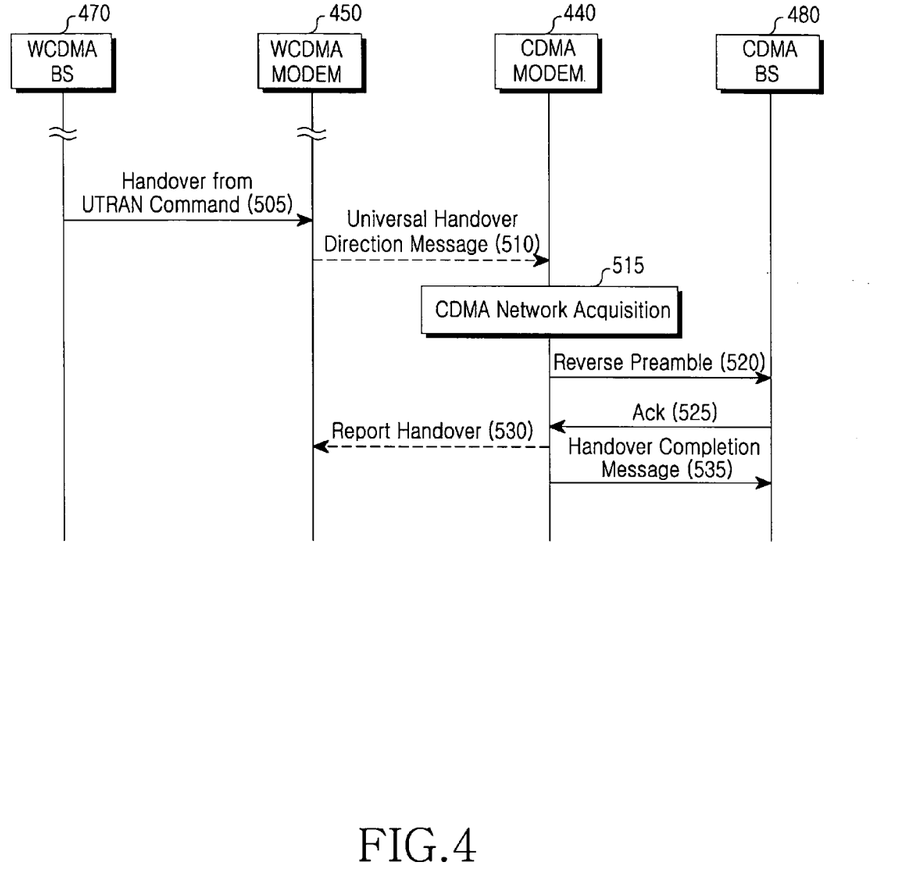
FIG. 4 is a view illustrating a signal flow between modems for handover network acquisition during communication according to the present invention.

FIG. 4 is a view illustrating a signal flow between modems for handover network acquisition during communication according to the present invention. When a handover occurs, the WCDMA modem 450 receives a handover from UTRAN command message, which informs that a handover must be performed, from a WCDMA base station 470 (step 505). Then, the WCDMA modem 450 extracts a UHDM, which includes information about a handover base station, from the handover from UTRAN command message, and transmits the UHDM through the communication path 460 to the CDMA modem 440 (step 510). In this case, since the CDMA modem 440 is in a standby state, in which the CDMA modem 440 is powered on, due to the communication performance, the CDMA modem 440 can receive the UHDM.

When the UHDM has been received, the CDMA modem 440 extracts base station information from the UHDM by parsing the UHDM, and performs CDMA network acquisition based on the extracted information (step 515). Herein, the UHDM includes information about a handover base station, such as a base station identification code and a frequency channel. When a CDMA network has been acquired through such a procedure, the CDMA modem 440 transmits a reverse preamble message for communication initialization to the corresponding CDMA base station 480 (step 520). When it has received an acknowledgment message from the CDMA base station 480 in response to the reverse preamble message (step 525), the CDMA modem 440 performs steps 530 and 535 for determining that preparation for communication with the CDMA base station 480 has been completed, thereby completing the handover, so that the terminal can operate in the CDMA mode.

As described above, since network acquisition is performed by using handover channel information extracted from a UHDM, without using a PRL, it is possible to minimize a period of time required to acquire a network. In addition, since information about an optimum channel is provided through the UHDM, an RF tuning procedure, which may occur later, can be omitted, thereby reducing the total handover processing time period.

Figure 5:
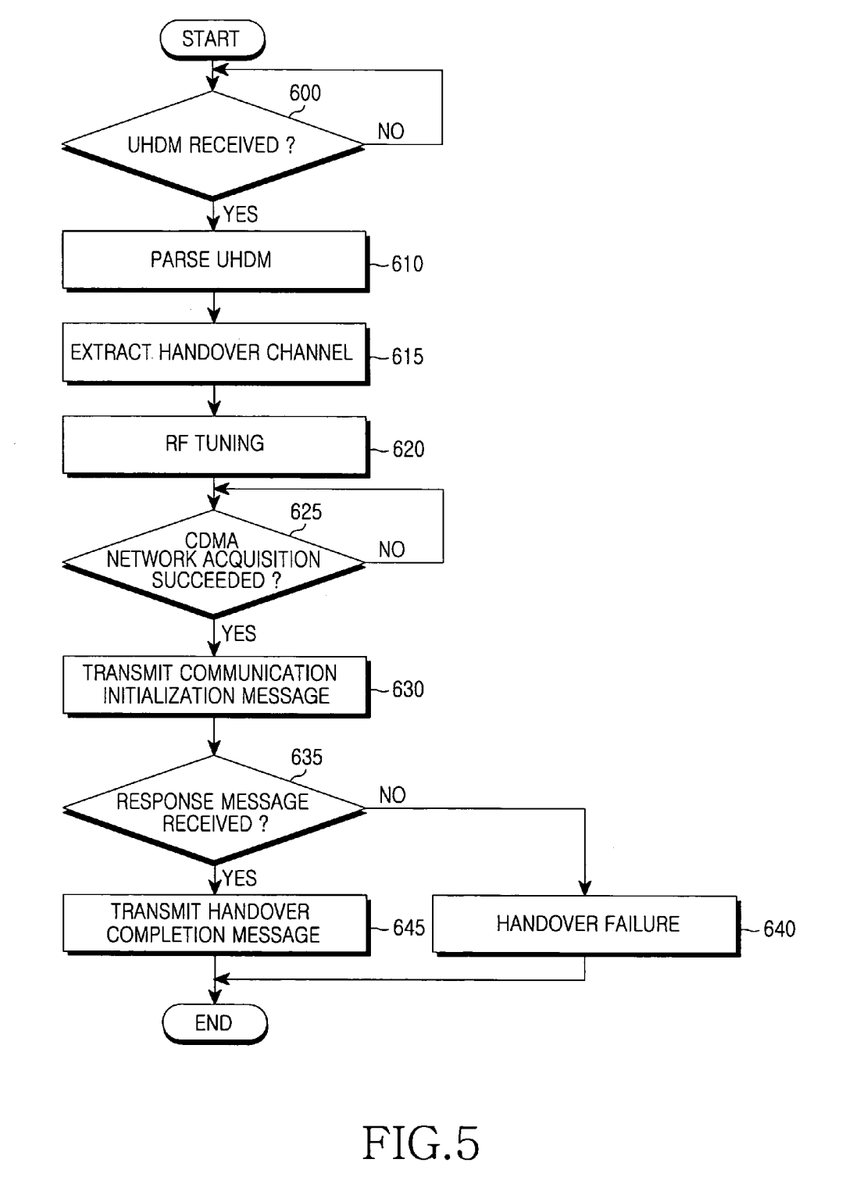
FIG. 5 is a flowchart illustrating a control flow of a multi-mode terminal for performing handover network acquisition according to the present invention.

FIG. 5 is a flowchart illustrating a control flow of a multi-mode terminal for performing handover network acquisition according to the present invention.

When the terminal starts communication in a WCDMA mode, the CDMA modem 440 is powered on. In this case, although the CDMA modem 440 does not perform a service acquisition procedure, the CDMA modem 440 enters a standby state so as to perform network acquisition when receiving a UHDM from the WCDMA modem 450.

When CDMA network acquisition begins, the CDMA modem 440 determines whether there is a UHDM received from the WCDMA modem 450 (step 600). When there is no UHDM received from the WCDMA modem 450, the CDMA modem 440 performs the same network acquisition procedure as the conventional CDMA network acquisition procedure. Therefore, the CDMA modem 440 performs a CDMA network acquisition procedure by using a PRL. In contrast, when the CDMA modem 440 receives a UIIDM, a handover occurs while communication is being performed in the WCDMA mode.

When it has received a UHDM, the CDMA modem 440 parses the UHDM (step 610) without using a PRL, extracts a handover channel through the parsing operation (step 615), and performs an RF tuning to the handover channel (step 620). Then, the CDMA modem 440 determines whether the CDMA network acquisition has succeeded (step 625). When it is determined that the CDMA network acquisition has succeeded, the CDMA modem 440 transmits a reverse preamble message to a corresponding base station in step 630 in order to perform a communication initialization step with the corresponding base station. In step 635, the CDMA modem 440 determines whether the CDMA modem 440 receives a response message to the reverse preamble message. Then, the CDMA modem 440 transmits a handover completion message, which informs that preparation for a handover has been completed, to the corresponding base station in step 645 only when the CDMA modem 440 has received a response message to the reverse preamble message. If CDMA modem 440 has not received the response message, the CDMA modem 440 performs a handover failure due to recognition for a handover has been failed in step 640.

As described above, when it has received a UHDM from the WCDMA modem 450 through an internal communication path, the CDMA modem 440 determines whether the CDMA modem 440 uses the UHDM or a typical PRL in order to perform a network acquisition procedure before performing the network acquisition procedure. To this end, the CDMA modem 440 determines whether a currently-required network acquisition procedure corresponds to an initial network acquisition procedure generally performed when the terminal is powered on, or to a network acquisition procedure performed when a UHDM for a traffic handover is received and is in a standby state. Before starting network acquisition, the CDMA modem 440 determines whether a UHDM is received, and the CDMA modem 440 directly acquires a network by using a handover channel included in a UHDM only when the CDMA modem 440 has received the UHDM.

When the CDMA modem 440 is to perform a traffic handover after having received a UHDM from the WCDMA modem 450, the CDMA modem 440 extracts CDMA channel information and band information by parsing the UHDM, without entering a PRL searching procedure. Next, the CDMA modem 440 performs RF tuning using the extracted information, thereby performing system acquisition by using a CDMA channel specified in the UHDM. Accordingly, in contrast to the prior art, since a network has been acquired through the handover channel, the CDMA modem can initialize communication with the corresponding base station by directly transmitting a reverse preamble message to the corresponding base station, without repeating the procedure of analyzing the UHDM, extracting a CDMA channel and performing an RF tuning. Then, when it has received an acknowledgment message, the CDMA modem transmits a handover completion message (HCM) to the base station in order to notify the base station that the handover has succeeded, thereby completing the handover.

As described above, when a multi-mode terminal supporting both CDMA and WCDMA modes performs a traffic handover, a handover network can be effectively acquired, so that it is not necessary to repeat the procedure due to failure of network acquisition. In addition, since an additional RF tuning procedure can be omitted during the transition into a traffic mode, it is possible to reduce the handover processing time, and to transmit a handover completion message within a handover time allowed by the base station, thereby increasing the success rate of the handover.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for efficiently acquiring a handover network in a multi-mode terminal, which includes a first modem and a second modem supporting different communication services, the method comprising the steps of:
    determining whether a Universal Handover Direction Message (UHDM) is received from a first communication network by the first modem when it is necessary to acquire a handover network;
    extracting information about a handover base station from the UHDM by the second modem when the UHDM has been received from the first modem; and
    acquiring directly a second communication network using the extracted information by the second modem and then completing handover; and
    acquiring the second communication network using a preferred roaming list when the UHDM is not received,
    wherein the information about the handover base station includes at least one of a handover channel and a base station identification code.

2. The method as claimed in claim 1, further comprising:
    receiving, by the first modem, a Handover from UMTS Terrestiral Radio Access Network (UTRAN) Command message to instruct a handover from the first communication network;
    extracting the UHDM from the Handover from the UTRAN Command message to instruct the handover; and
    transmitting the extracted UHDM to the second modem.

3. The method as claimed in claim 1, wherein the first communication network and second communication network correspond to a Code Division Multiple Access (CDMA) network and a Wideband Code Division Multiple Access (WCDMA) network, respectively, and the first and second modems process signals transmitted and received through the CDMA network and WCDMA network, respectively.

4. The method as claimed in claim 1, wherein the first communication network and second communication network correspond to a Global System for mobile communications (GSM) network and a WCDMA network, respectively, and the first modem and second modem process signals transmitted/ and received through the GSM network and WCDMA network, respectively.

5. A multi-mode terminal for efficiently acquiring a handover network, the multi-mode terminal comprising:
    a first modem for extracting a Universal Handover Direction Message (UHDM) from a handover command message, when the first modem receives the handover command message from a first communication network while communicating through the first communication network; and
    a second modem for receiving the extracted UHDM from the first modem and acquiring directly a second communication network based on information about a handover base station, which is included in the received UHDM for completing handover,
    wherein the information about the handover base station includes at least one of a handover channel and a base station identification code;
    wherein the second modem acquires the second communication network by using a preferred roaming list if the UHDM is not received, when it is necessary to acquire a handover network.

6. The multi-mode terminal as claimed in claim 5, wherein the first communication network and second communication network correspond to a Code Division Multiple Access (CDMA) network and a Wideband Code Division Multiple Access (WCDMA) network, respectively, and the first and second modems process signals transmitted and received through the CDMA network and WCDMA network, respectively.

7. The multi-mode terminal as claimed in claim 5, wherein the first communication network and second communication network correspond to a Global System for Mobile communications (GSM) network and a WCDMA network, respectively, and the first modem and second modem process signals transmitted and received through the GSM network and WCDMA network, respectively.

8. The multi-mode terminal as claimed in claim 5, wherein, when receiving the UHDM from the first modem, the second modem parses the received UHDM, and acquires the second communication network using a handover channel which has been extracted through the parsing operation.

\* \* \* \* \*